Patented May 7, 1940

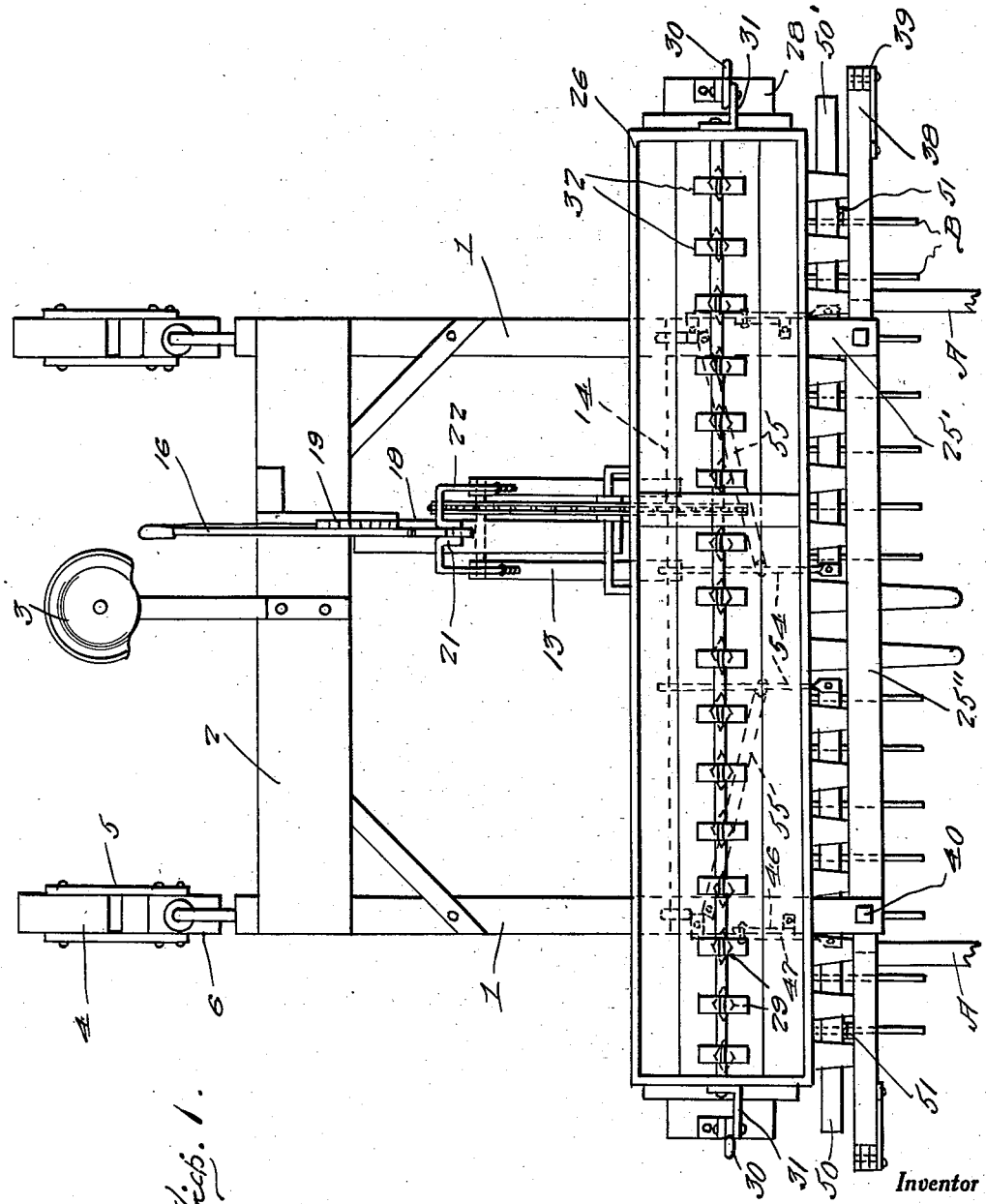

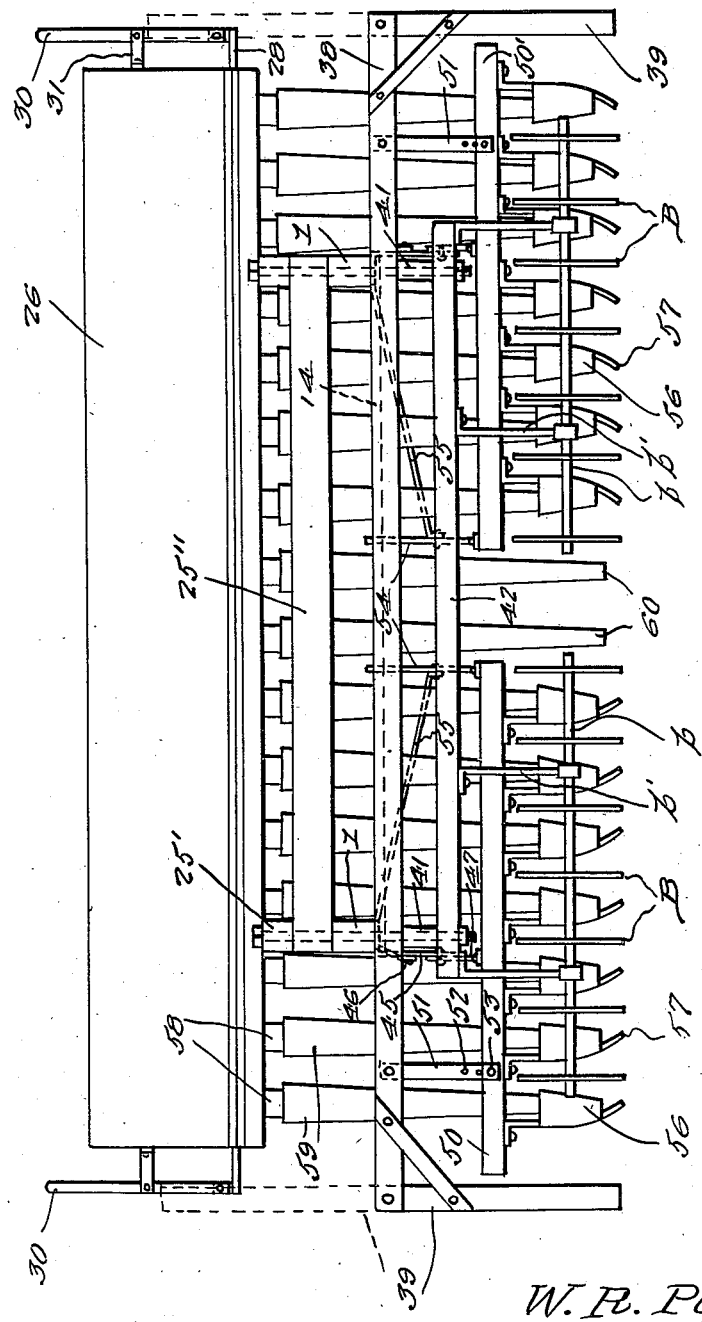

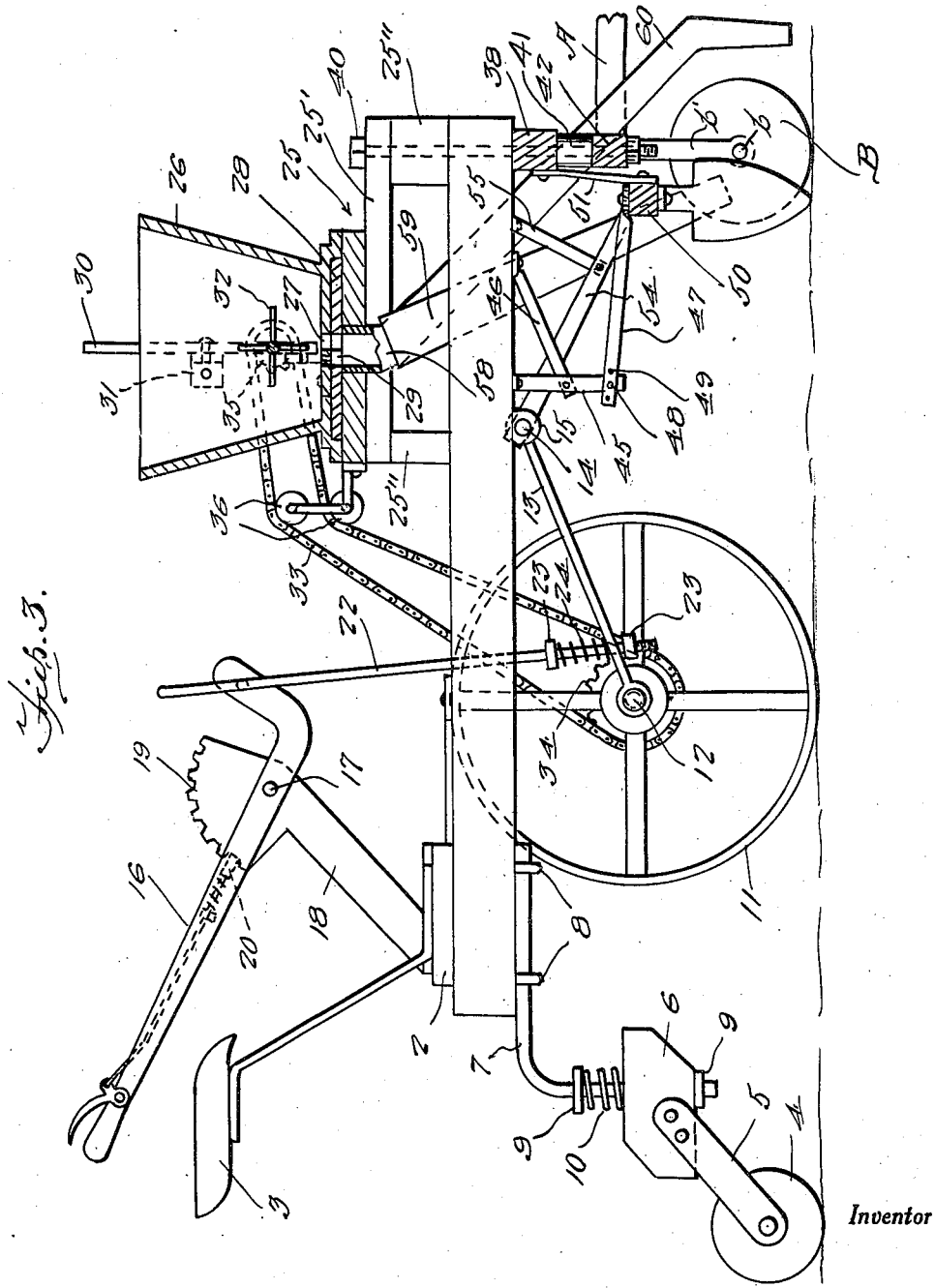

2,199,755

UNITED STATES PATENT OFFICE 2,199,755

SEEDER ATTACHMENT FOR DISK HARROWS

Walter R. Pyron, Comfort, Tex.

Application November 30, 1938, Serial No. 243,251

2 Claims. (Cl. 111—1)

This invention relates to a seeder attachment for disk harrows, the general object of the invention being to provide means for depositing seed into the furrows made by the disks of the harrow so that the land is harrowed and seeded at the one operation, thus saving time and expense.

Figure 1 is a top plan view of the invention.

Figure 2 is a front view thereof.

Figure 3 is an elevational view with parts in section.

In these drawings the side members of the frame of the apparatus are shown at 1 and these side members are connected together adjacent their rear ends by a cross-piece 2 which carries the seat 3 for the operator. Small wheels 4 are connected by the bars 5 to the blocks 6, each block being supported for pivotal movement at the rear of a side member 1 through means of the angle bar 7 having its horizontal leg connected to a side member 1 as shown at 8 and its vertical leg passing through a hole in the block and said vertical leg having the upper and lower stop members 9 thereon, and a spring 10 is arranged between the block and the upper member 9 as shown. Thus these wheels 4 act as caster wheels for supporting the rear end of the frame.

A larger wheel 11 has its spindle 12 carried by the bars 13, said bars extending upwardly and forwardly and are suspended on the cross shaft 14 supported by hangers 15 suspended from the cross members 1. This wheel can be raised and lowered through means of the lever 16 pivoted at 17 to the upwardly and forwardly extending support 18 carried by the cross member 2 and the upper end of the support forms the tooth segment 19 for engagement by the detent 20 of the lever. The front end of the lever curves upwardly and has a hole therein through which passes the crank 21 of a substantially U-shaped member 22, the lower ends of the legs of which pass through holes in the bars 13 and said legs have the upper and lower stops 23 thereon with a spring 24 located on the lower end of each leg of the member 22 and having one end bearing against the bar 13 and its upper end against the stop 23. Thus by manipulating the lever the wheel 11 can be raised and lowered as desired, the bars 13 swinging on the shaft 14.

A small frame 25 is supported on the front of the main frame and carries the seed box 26 having a row of openings 27 in its bottom which are controlled by a valve plate 28 having the row of large holes 29 therein. This valve plate is adjusted by means of the levers 30 at the ends of the box, each lever being pivoted to a projecting end of the valve plate and pivoted intermediate its ends to a bracket 31 attached to an end of the box.

Thus the flow of seed from the box can be controlled by adjusting this valve plate 28.

An agitator 32 is arranged in the box for agitating the seed therein and this agitator is driven from the wheel 11 through means of the chain 33 and the sprocket 34 carried by the wheel 11 and the sprocket 35 on one end of the shaft of the agitator. The chain passes over the rolls 36 which may be adjustable in any suitable manner to keep the chain tight.

A long transverse bar 38 passes under the front ends of the side members 1 and has the legs 39 fastened to its ends in such a manner that said legs can be easily moved from the depending position, shown in full lines in Figure 2, to an upright position as shown in dotted lines in Figure 2, each leg serving the purpose, when in lowered position, of supporting the front end of the attachment when the same is not being used. When in use the legs are swung upwardly to the dotted line position in Figure 2.

The small frame 25 includes the side pieces 25' and the front and rear pieces 25" which rest on the side members 1 and long bolts 40 pass through the side pieces 25', the front member 25", the front ends of the members 1, through the sleeves 41 and into the rear cross member 42 of the frame A of the harrow, the rear disks of which are shown diagrammatically at B. As shown these rear disks are arranged in two sets, each set being carried by a shaft b carried by the hangers b' depending from the member 42 of the harow.

A hanger 45 depends from each side member 1 in front of the shaft 14 and a brace 46 connects each hanger to a forward part of a member 1. A bar 47 has its rear end adjustably connected to the lower end of each hanger 45 through means of the bolt 48 carried by the hanger and passing through any one of a row of holes 49 in the rear end of the bar 47. The front end of one of these bars 47 is fastened to a transverse beam 50 and the other bar 47 is connected at its front end to a transverse beam 50' and these beams 50 and 50' can be adjusted vertically on the hangers 51 depending from the beam 38 as each hanger has a row of holes 52 in its lower end any one of which is adapted to receive a bolt 53 which passes into a beam 50 or 50'. The lengthwise axes of the beams 50 and 50' are aligned transversely of the attachment frame and the inner end of each beam is supported by a bar 54, the rear end of which is connected with the shaft 14 and its front end with a beam 50 or 50'. A brace 55 connects each bar 54 with a member 1. The bars 54 have their front ends adjustably connected with the beams 50 and 50' and the members 51 and 55 are so formed as to permit the beams to be adjusted on the bars 47 and 54.

The beams 50 and 50' carry the chutes 56, one for each disk B and each chute has a depending ground-engaging member 57 thereon. These chutes and the ground-engaging elements are so constructed and arranged that they will deposit seed falling thereinto into the furrows made by the disks B.

Chutes 58 depend from the seed box and receive the seed passing from the box and boots 59 connect the chutes 58 with the chutes 56 so that seed passing from the chutes 58 will pass through the boots 59 into the chutes 56 which in turn deposit the seed into the furrows made by the disks of the harrow.

Long boots 60 receive some of the seed from the box and deposit it into the furrows made by the front disks of the harrows, these long boots depositing the seed into such furrows that are located between the inner disks at the rear of the harrow, as shown in Figure 2.

When it is desired to seed a field the attachment is connected with the rear part of the harrow by means of the bolts 40 and the legs 39 are swung upwardly into the dotted line position shown in Figure 2 and the parts are adjusted to properly position the chutes 56 relative to the disks B at the rear of the harrow so that the seed will be dropped into the furrows made by these disks. Then the valve plate 28 is adjusted to permit the desired amount of seed to pass from the box into the chutes and boots and then the apparatus is ready to use. As the attachment is drawn along by the harrow the operator on seat 3 manipulates the lever 16 to cause the wheel 11 to properly engage the ground and cause the wheel to drive the agitator 32 which, of course, causes the seed to pass from the box into the chutes 58.

It is thought from the foregoing description that the advantages and novel features of the invention will be readily apparent.

It is to be understood that changes may be made in the construction and in the combination and arrangement of the several parts provided that such changes fall within the scope of the appended claims.

Having thus described the invention what is claimed as new is:

1. A seeder attachment for a disk harrow comprising a frame including a pair of side members and a transverse bar extending under the front ends of the side members, said bar projecting beyond the sides of the frame, wheels for supporting the rear of the frame, a small frame mounted on the front part of the first-mentioned frame, a seed box mounted on the small frame, long bolts passing through front portions of the small frame, through the front ends of the side members of the main frame and through the transverse bar and through the rear member of the harrow frame, said bolts acting to connect the front of the main frame with the rear of the harrow frame, sleeves on the bolts and located between the transverse bar and the harrow frame, a transverse beam, chutes depending from the beam and arranged to deposit seed into the furrows made by the disks of the harrow and depending means for connecting said transverse beam to the front portion of the main frame, and means for conveying seed from the seed box into said chutes.

2. A seeder attachment for a disk harrow comprising a main frame having supporting wheels at its rear and including side members and a long transverse bar passing under the front ends of the side members and connected therewith, the ends of the bar projecting beyond the sides of the frame, legs pivotally connected with the ends of the bar for engaging the ground for holding the front of the frame in raised position, said legs being swung upwardly when not in use, means for connecting said bar with the rear disk carrying member of a harrow, a pair of transverse beams transversely aligned, chutes depending from said beams, hanger bars depending from the long bar and each hanger bar being connected with an outer portion of a chute carrying beam, a bracket connecting the inner end of each chute carrying beam with a portion of the main frame, hangers depending from the side members, and substantially horizontal bars having their rear ends adjustably connected with said hangers and their front ends connected with intermediate portions of the chute carrying beams, the chutes being positioned to drop seed into the furrows made by the disks of the harrow, a seed box carried by the frame and means for leading seeds from the box into the chutes.

WALTER R. PYRON.